Figure 1:
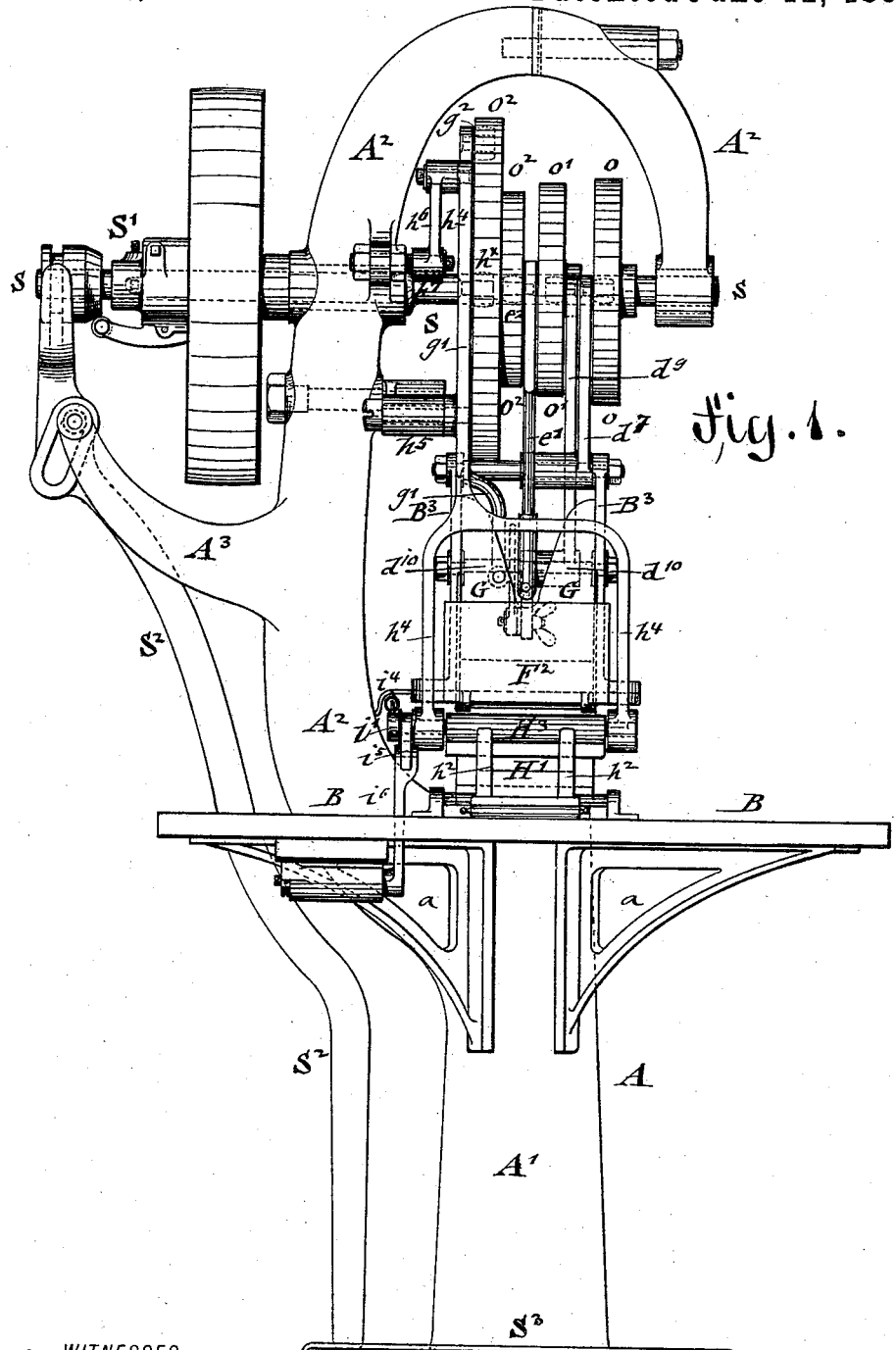

(No Model.) 9 Sheets—Sheet 1.

D. J. BOEHM & C. F. REED.
CIGAR BUNCHING MACHINE.

No. 384,556. Patented June 12, 1888.

WITNESSES:
INVENTORS
BY
ATTORNEYS.

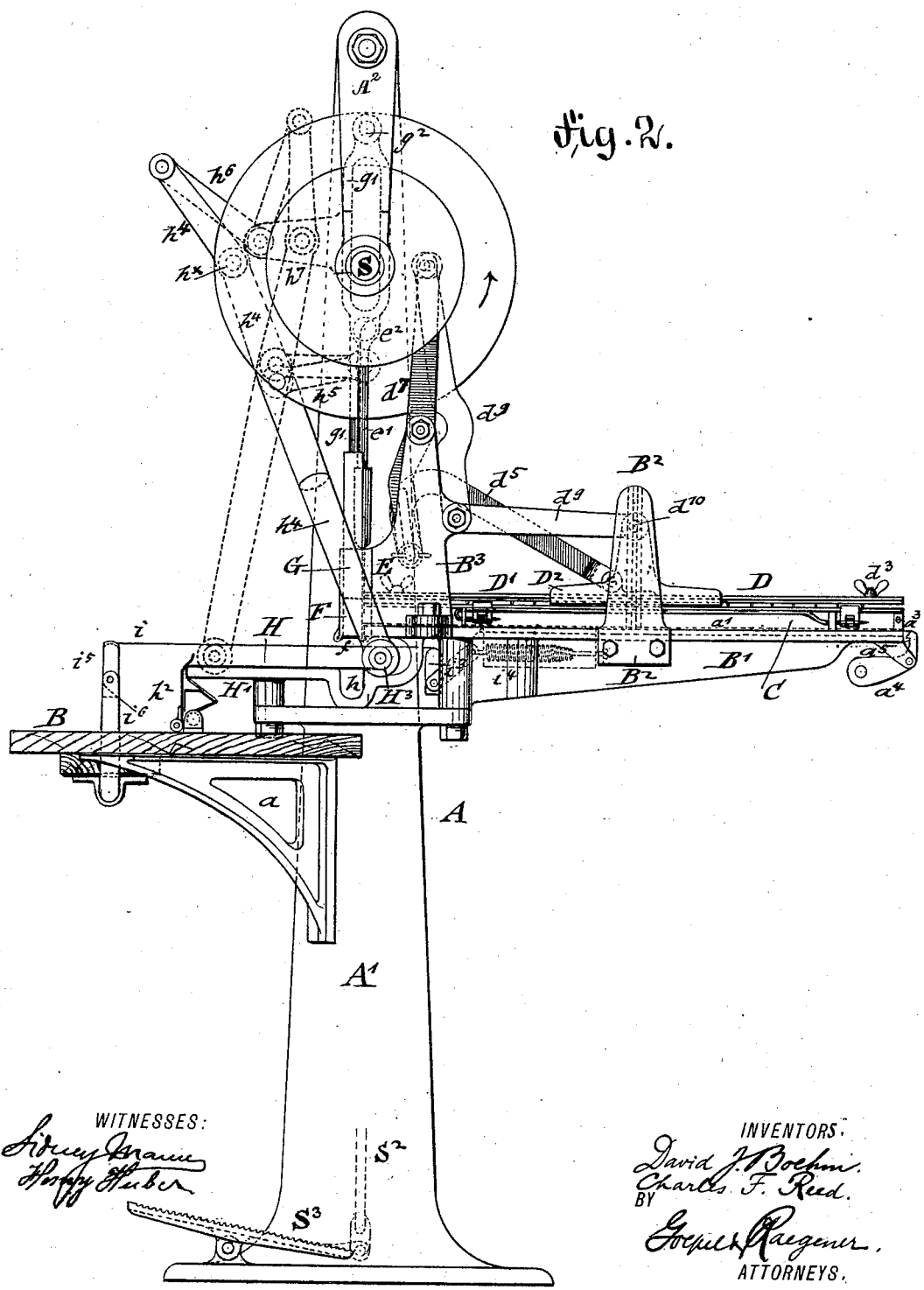

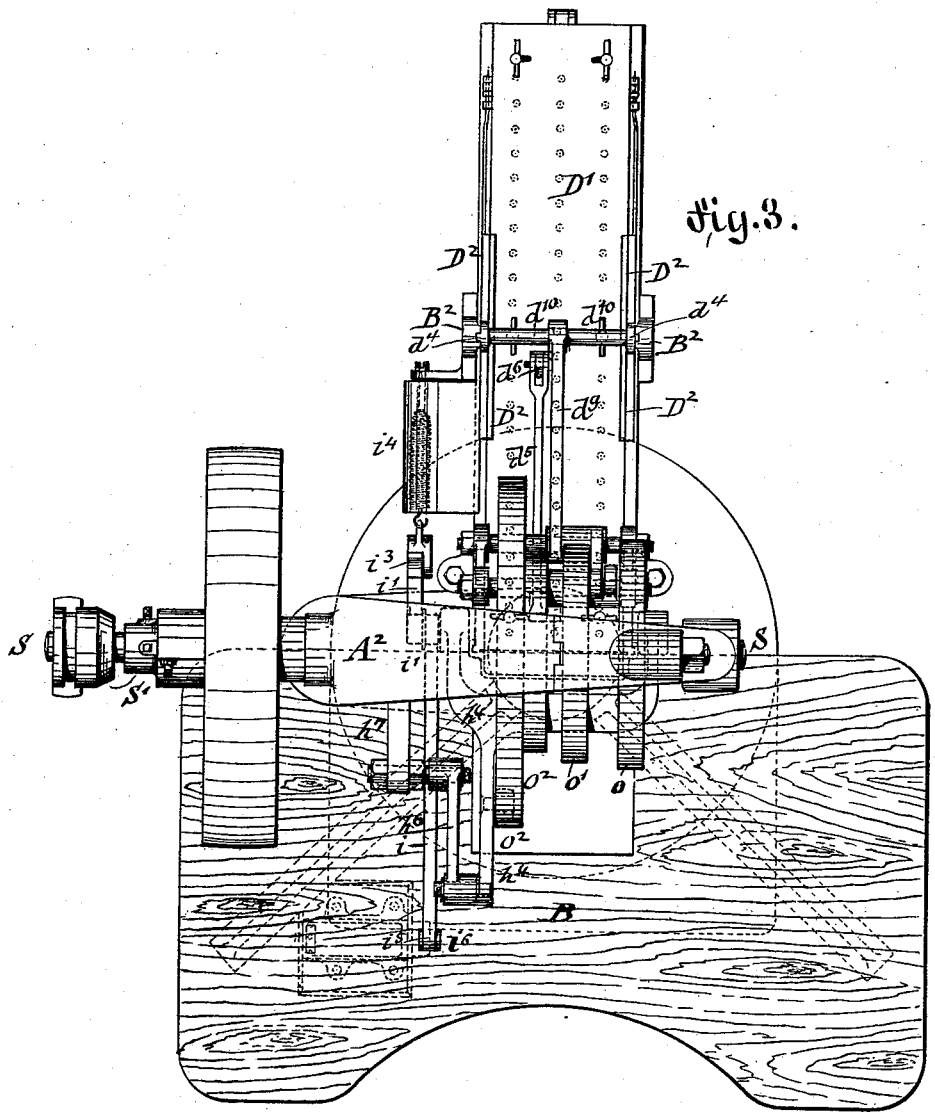

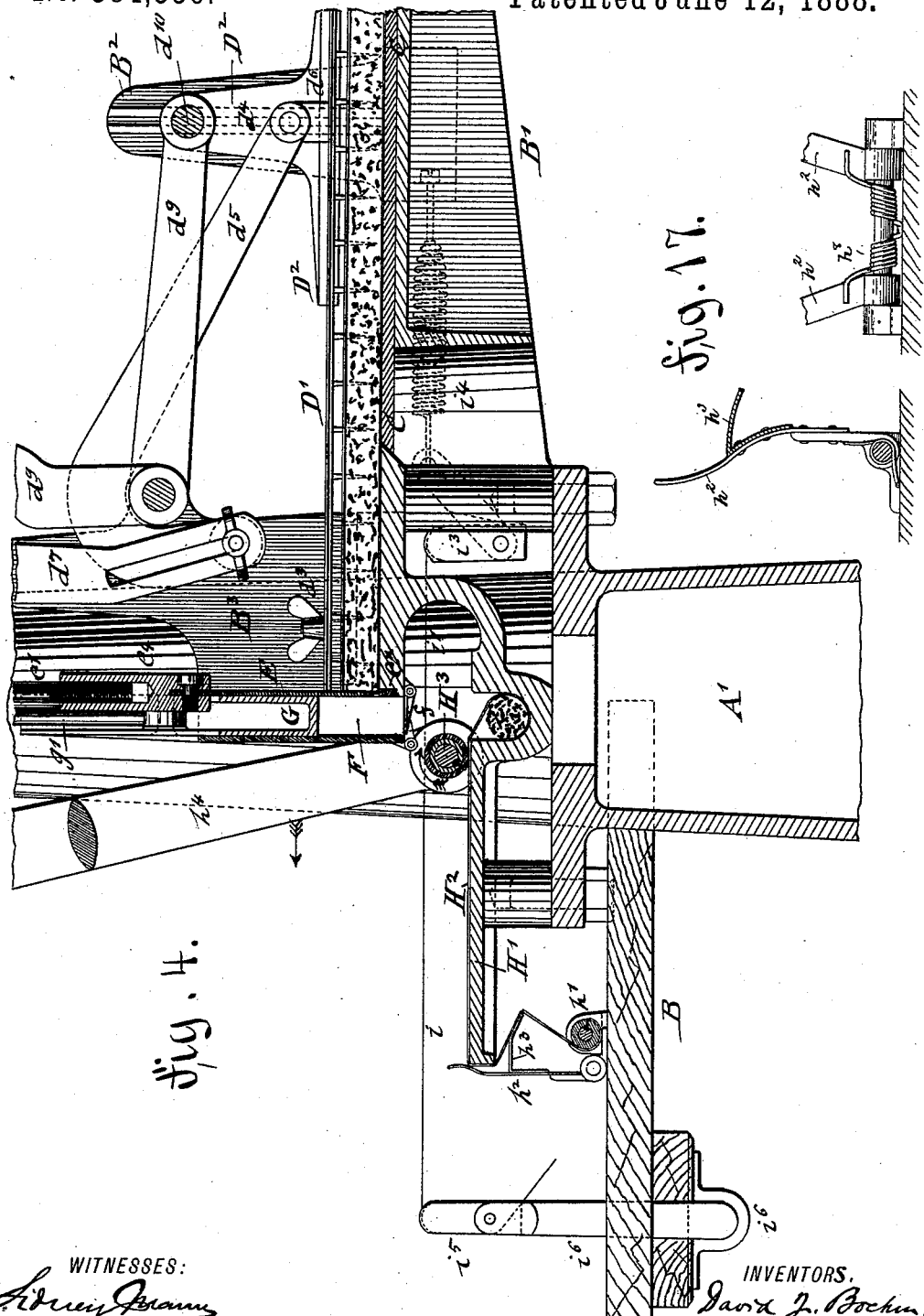

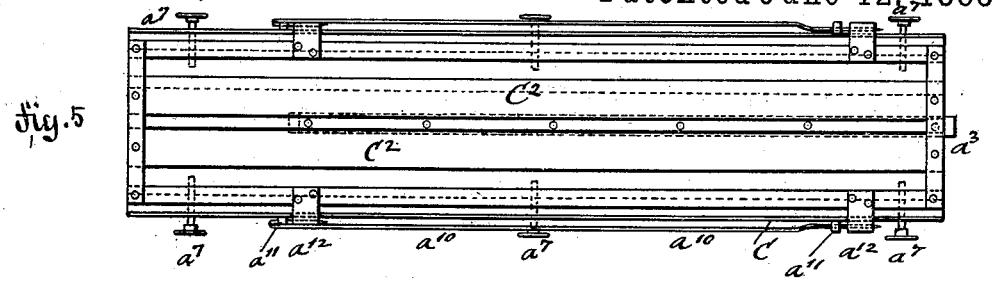

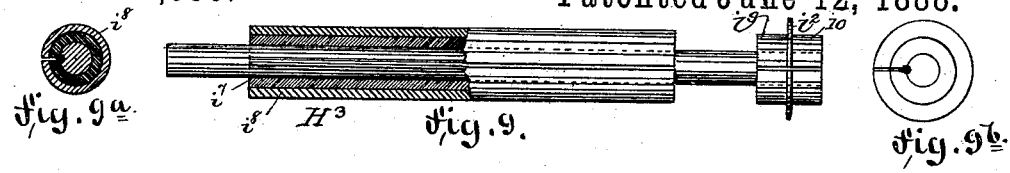
(No Model.) 9 Sheets—Sheet 6.
D. J. BOEHM & C. F. REED.
CIGAR BUNCHING MACHINE.
No. 384,556. Patented June 12, 1888.
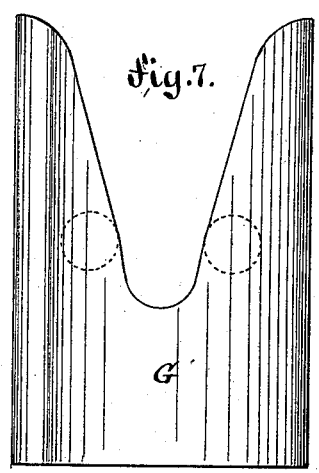
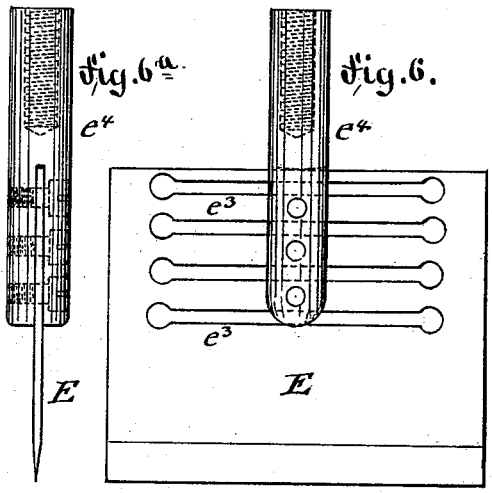
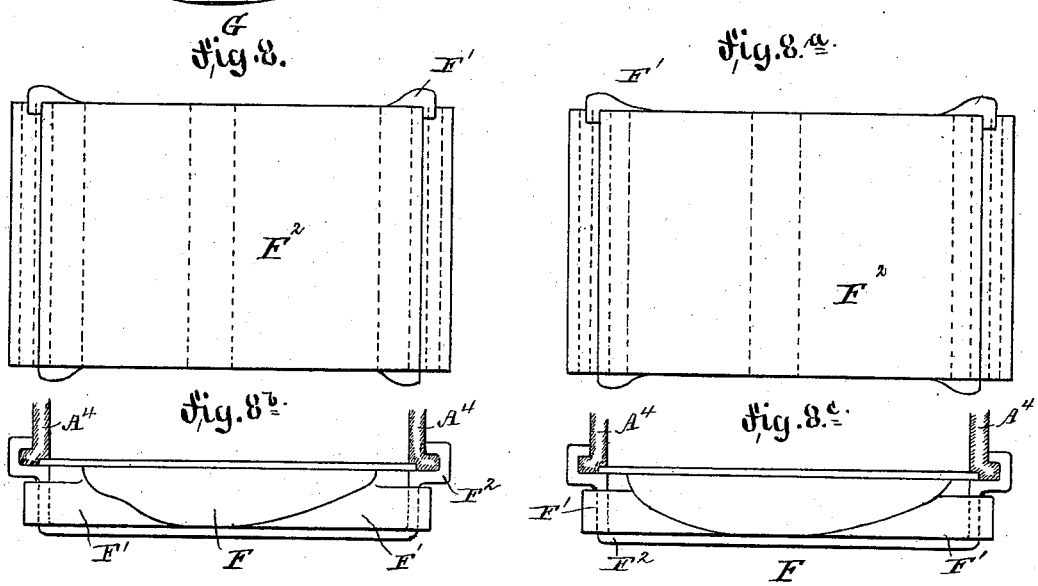
WITNESSES:
INVENTORS,
David J. Boehm,
Charles F. Reed.
BY
ATTORNEYS.

(No Model.)
D. J. BOEHM & C. F. REED.
CIGAR BUNCHING MACHINE.
No. 384,556.
9 Sheets—Sheet 7.
Patented June 12, 1888.
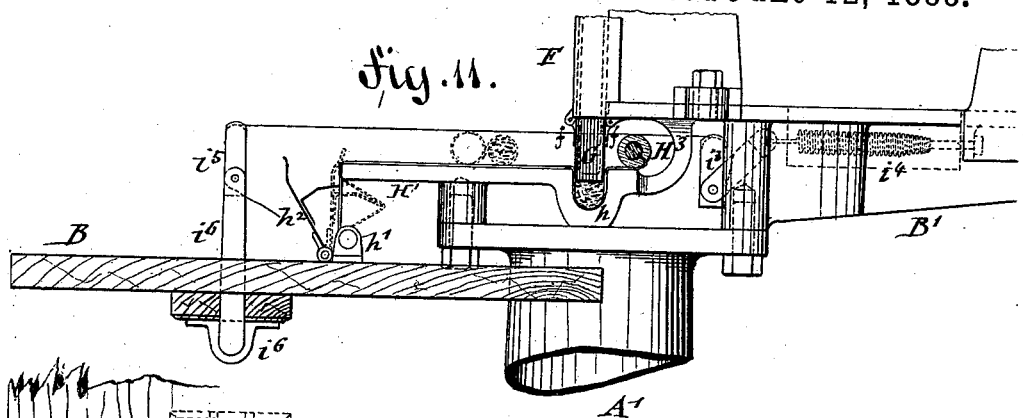
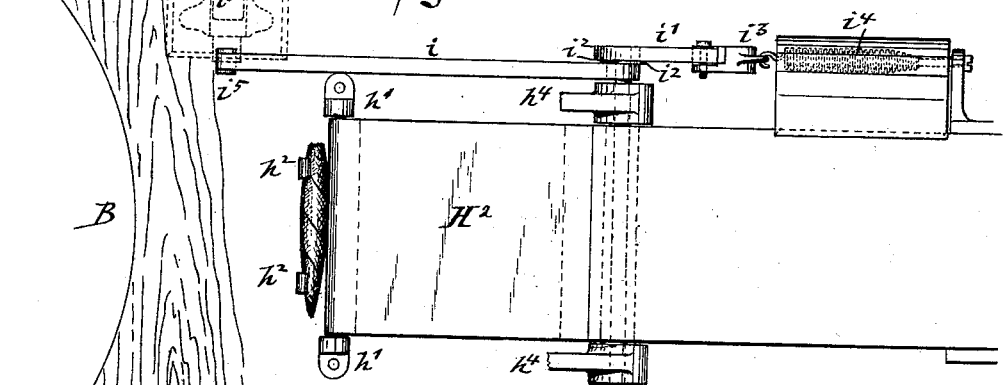
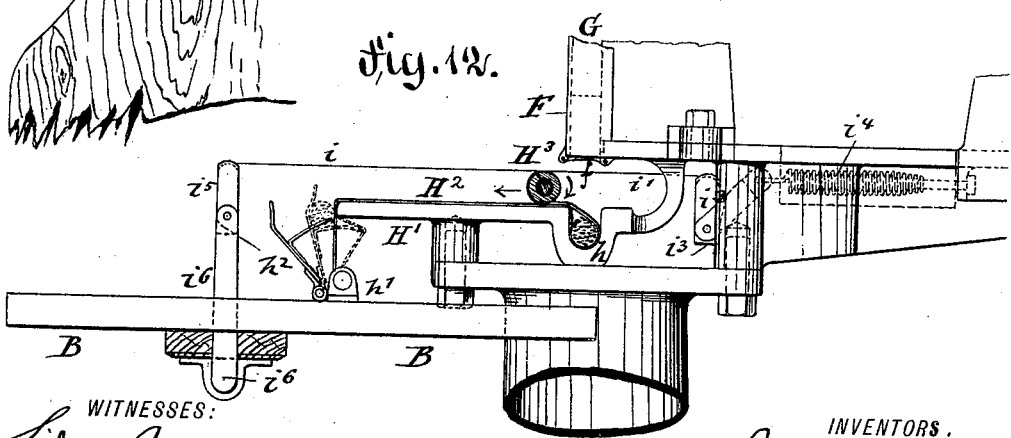
WITNESSES:
INVENTORS.
David J. Boehm,
BY Charles F. Reed.
ATTORNEYS.

(No Model.)   D. J. BOEHM & C. F. REED.   9 Sheets—Sheet 8.
CIGAR BUNCHING MACHINE.

No. 384,556.   Patented June 12, 1888.

WITNESSES:
Sidney Isaac
Henry Huber

INVENTORS,
David J. Boehm
Charles F. Reed
BY
Goepel & Raegener
ATTORNEYS.

(No Model.)

D. J. BOEHM & C. F. REED.
CIGAR BUNCHING MACHINE.

No. 384,556.   Patented June 12, 1888.

WITNESSES:
Robert N. Kenyon.
Arthur Van Sielen.

INVENTORS,
D. J. Boehm
C. F. Reed

BY W. H. Kenyon
ATTORNEY.

UNITED STATES PATENT OFFICE.

DAVID J. BOEHM AND CHARLES F. REED, OF NEW YORK, N. Y., ASSIGNORS, BY DIRECT AND MESNE ASSIGNMENTS, TO THE NORTH AMERICAN CIGAR MACHINERY COMPANY OF THE CITY OF NEW YORK.

CIGAR-BUNCHING MACHINE.

SPECIFICATION forming part of Letters Patent No. 384,556, dated June 12, 1888.

Application filed November 1, 1887. Serial No. 254,023. (No model.)

*To all whom it may concern:*

Be it known that we, DAVID J. BOEHM and CHARLES F. REED, both of the city, county, and State of New York, have invented certain new and useful Improvements in Cigar-Bunching Machines, of which the following is a specification.

This invention has reference to a bunching-machine of that class in which, by the combined action of a suitable feeding mechanism, a cutting-knife, a plunger, a retaining-box for receiving the tobacco cut off by the knife, and a rolling device, bunches composed of long-filler tobacco and a binder are automatically produced in any size and shape.

In bunching-machines for making long-filler bunches heretofore in use the feeding mechanism generally consisted either of continuously-traveling belts or of a movable feed-box containing the tobacco, which box was guided in a stationary frame, the tobacco being intermittingly fed forward by the feed-box and a vertically-reciprocating gripping device. These constructions, however, are only adapted to produce long-filler bunches of one shape, and cannot produce bunches of any desired size and shape, which is one of the essential requirements of a good cigar-bunching machine. Moreover, they jam and unduly compress the filling in the operation of feeding it. In bunching-machines for making long-filler bunches heretofore in use traveling or stationary belts have been used, or the belt has been wound up simultaneously with the rolling, but on a supplementary roller not in contact with the bunch that is being rolled.

The object of our invention is to furnish a cigar-bunching machine in which the feed mechanism is so constructed that bunches of any shape and size can be produced in a quick and perfect manner, and in which the construction of the different working parts of the machine—such as the feeding device, the cutting-knife, the plunger, the retaining-box, and the rolling device—are improved with a view to produce a bunch of perfect shape and any desired size.

To that end the invention (in the feeding mechanism part thereof) consists in the combinations, hereinafter claimed, of a closed stationary feed-box in which the filling is primarily distributed by hand, and then that distribution, the box being closed, is maintained throughout the feeding, and a toothed feed-gripper having the four right-lined motions hereinafter described, the teeth of the feed-gripper entering through slots in the feed-box and piercing the mass of the filling, and then moving it bodily forward, and withdrawing from it without disturbing its distribution, the operation of the feed-gripper incidentally loosening up the mass that is being fed forward, and (in the rolling mechanism part thereof) consists in the combinations, hereinafter claimed, with the ordinary rolling-table and apron, of a bight-forming roller constructed to rotate simultaneously with the bunching reciprocation, and by such rotation to wind up the apron on it, so that its effective bearing-surface on the bunch that is being rolled is progressively increased as the rolling proceeds and the bight of the apron also progressively tightens.

The invention also consists of the combinations, hereinafter claimed, in a cigar-bunching machine, of an improved feed mechanism composed of a detachable feed-box and a vertically and longitudinally reciprocating feed-gripper, a vertically-reciprocating cutting-knife moving up and down at the front end of the stationary feed-box, a retaining-box for receiving the tobacco, provided with hinged and spring-actuated bottom gates, a vertically-reciprocating plunger for transferring the tobacco cut off by the knife into a bight of the rolling-apron, and a rolling device of improved construction, by which the binder is wound around the filler delivered by the plunger, in such a manner that the apron is wound up directly on the roller, being preferably first unwound from the roller, so as to give it the required slack to receive the filler, and then wound upon the roller, so as to take up the slack, raise the filler from the pocket of the rolling-table, and revolve it with the binder in the gradually-tightening bight formed by the apron, after which the bunch is delivered from the same.

The invention consists, further, of certain details of construction and combination of parts, which features will be fully set forth in connection with the description of said parts, and finally pointed out in the claims.

Figure 13:
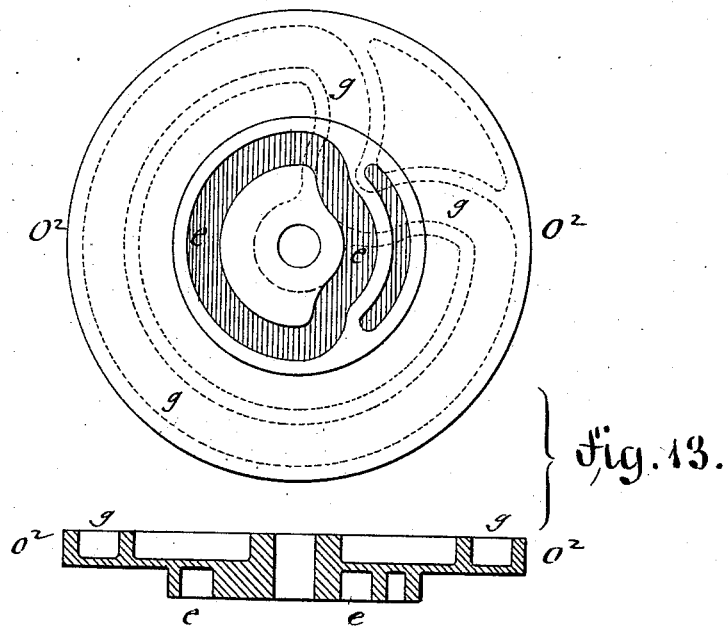
Figure 14:
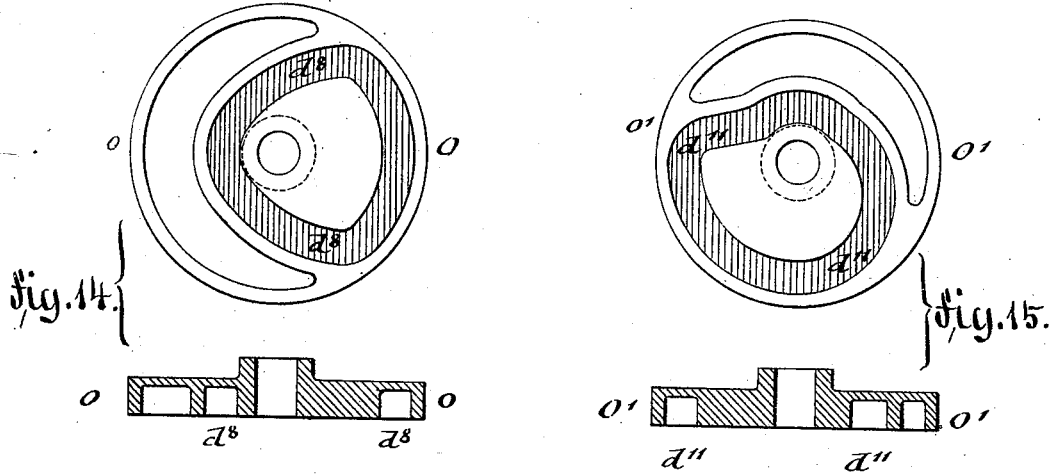
Figure 15:
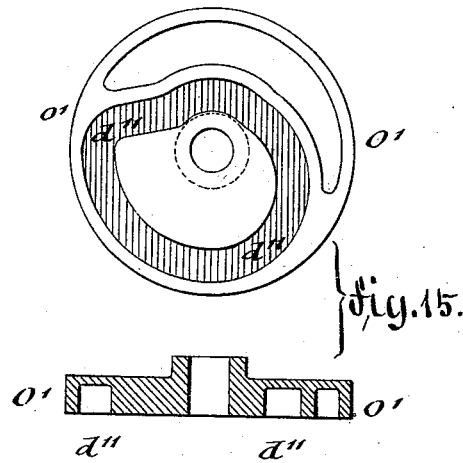
Figure 16:
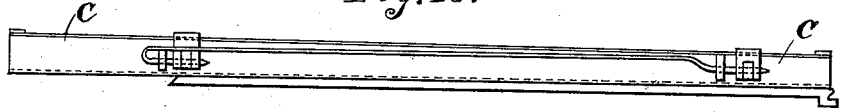

In the accompanying drawings, Figure 1 represents a front elevation of our improved cigar-bunching machine. Fig. 2 is a side elevation; Fig. 3, a plan; Fig. 4, a vertical longitudinal section of the same, drawn on a larger scale than the first three figures. Figs. 5 and $5^a$ are respectively a top view and a side view of the stationary feed-box, drawn on a large scale. Figs. $5^b$ and $5^c$ are a top and a side view, respectively, of the reciprocating feed-gripper, also on a large scale. Figs. $5^d$ and $5^e$ are vertical transverse sections, respectively, of the stationary feed-box and the feed-gripper, and of the feed-box with the gripper and cover removed, said figures being drawn on a still larger scale than the preceding figures. Figs. 6 and $6^a$ are detail side and end views of the cutting-knife. Figs. 7 and $7^a$ are detail side and bottom views of the plunger. Figs. 8, $8^a$, $8^b$, $8^c$ are details of the retaining-box in which the tobacco is supplied after it has been cut off by the knife. Figs. 9, $9^a$, and $9^b$ are details showing the construction of the roller of the rolling device. Figs. 10, 11, and 12 are respectively a plan and sectional side elevations of the rolling device, showing the same, respectively, in the act of receiving the filler and of rolling the same. Figs. 13, 14, and 15 are details of the cams by which motion is imparted, respectively, to the cutting-knife, plunger, and feed-gripper. Figs. 16 and 17 are details.

Similar letters of reference indicate corresponding parts.

Referring to the drawings, A represents the supporting-standard of our improved cigar-bunching machine, which is made of a pillar-shaped lower part, A', a yoke-shaped upper part, $A^2$, and an arm, $A^3$, that extends sidewise from the middle part of the yoke $A^2$. The pillar-shaped lower part, A', supports at its front part, on brackets $a$, a table, B, and at its rear part a bracket, B', on which the stationary feed-box C is supported. The yoke-shaped part $A^2$ of the standard A and the arm $A^3$ are provided with bearings for supporting the driving-shaft S, which is rotated by a belt-and-pulley transmission and thrown in or out of motion by a clutch, S', of any approved construction, operated by a clutch-lever, $S^2$, that is worked by a treadle, $S^3$, at the lower part of the machine, as shown in Fig. 1. On the shaft S are mounted, inside of the yoke-shaped upper part, $A^2$, a number of cams, O O' $O^2$, having cam-grooves, by which motion is transmitted to the different working parts of the machine, as will be fully set forth in connection with the description of these parts.

The working parts of the machine are a detachable feed-box, C, a vertically and longitudinally reciprocating feed-gripper, D, a vertically-reciprocating cutting-knife, E, which moves up and down in guides at the front end of the feed-box, a retaining box or chamber, F, for the tobacco cut off by the knife, a vertically-reciprocating plunger, G, and a rolling device, H, which latter is composed of a table, H', having a pocket, $h$, vertically below the plunger G, an apron, $H^2$, and a roller, $H^3$.

*The feed mechanism.*—The feed mechanism of our improved cigar-bunching machine is represented in Figs. 5 to $5^e$, and in Figs. 2, 3 and 4, and comprises the detachable feed-box C and the vertically and longitudinally-reciprocating feed-gripper D. The feed-box C has a closed bottom, C', which is locked to the supporting-bracket B' by means of a longitudinal tongue, $a'$, which fits into a corresponding groove of the supporting-bracket B', and is provided with an inclined front end, $a^2$, that engages the correspondingly-inclined end of the groove of the bracket B'. The hook-shaped rear end, $a^3$, of the tongue $a'$ is engaged by a weighted hook, $a^4$, that is pivoted to ears, $a^5$, at the rear end of the bracket B', as shown clearly in Fig. 2. The feed-box C is further provided with longitudinal side rails, $a^6$, which are made rectangular next to the side walls and bottom of the feed-box C, but arranged with a curved or tapering face, the shape of which corresponds to the shape of the bunch to be produced, one side rail, $a^6$, being curved on its upper face, so as to form or shape the tip or mouth end of the cigar, and the other side rail, $a^6$, being curved on its upper face, so as to form or shape the butt or lighting end of the cigar, as shown clearly in Figs. $5^d$ and $5^e$. These side rails, $a^6$, are readily removable, and others of different shape and curvature on their upper surfaces can be substituted where it is desired to change the shape of the ends of the cigars to be made; also, the side rails, $a^6$, are capable of lateral adjustment on the bottom of the feed-box C by means of screws $a^7$, which engage socket-holes of the side rails, $a^6$, and are retained in the same by set-screws $a^8$, which engage annular grooves $a^9$ at the inner ends of the screws $a^7$, so as to permit the axial turning of the screws in the side rails, $a^6$, without permitting the detaching of the screws from said rails. By the shape and lateral adjustment of the side rails, $a^6$, not only the quantity of tobacco placed in the feed-box is regulated, but also the size and ultimate shape of the cigar, the tapering ends of the rails permitting a larger quantity of tobacco to be placed in the box at the middle part and a smaller quantity at the side rails, the shapes of which determine the shape of the tip and butt-ends of the cigars. By this feature of our machine proper regard is had for producing the required length, thickness and shape of the cigar, the shape being produced by the curved faces of the side rails, while the length and thickness is governed by the lateral adjustment of the same.

The feed-box C is closed by a longitudinally-grooved top plate, $C^2$, which is attached thereto by suitable locking devices, which are preferably made of longitudinally-sliding rods $a^{10}$, that are guided in fixed ears $a^{11}$ of the side walls of the box C, said rods engaging perforated ears $a^{12}$ of the top plate, $C^2$, as shown in Figs. 5 and $5^a$. For supplying the feed-box C with tobacco, the same is removed from the supporting-bracket B' of the machine, the slotted top plate, $C^2$, detached from the box and the latter then filled by spreading the tobacco, in regular layers over the bottom and side rails of the same, the length of the filling lying, of course, across the width of the box. When the feed-box C is properly filled with tobacco, the top plate, $C^2$, is replaced and locked thereto by the slide-rods $a^{10}$ and the feed-box returned to the supporting-bracket B' and locked to the same by the bottom tongue, $a'$, and the weighted locking-hook $a^4$, it being thus held in a stationary position during the operation of the machine. The depth of the feed-box C increases slightly toward the front or delivery end of the same, so that the tobacco gets looser as it approaches the front end of the box. This is illustrated in Fig. 16, where the delivery or front end of the feed-box C is deeper than the rear end of the feed-box. The feeding of the tobacco from the box to the cutting-knife is performed by the feed-gripper D, which is formed of a plate, D', and of as many longitudinal strips $d$, armed with pins $d'$, as there are longitudinal slots in the top plate, $C^2$. The inner strip $d$ is permanently attached to the plate D' of the feed-gripper, while the outer strips are adjustable in lateral slots $d^2$ of the plate D' by means of thumb-nuts $d^3$, which engage fixed threaded shanks of the movable strips $d$, preferably at three points of the same, as shown clearly in Figs. $5^b$ and $5^c$. The outer rows of teeth or pins $d'$ are also vertically adjustable downward from their position shown in $5^d$, by simply inserting a washer of the desired thickness between the outer strip $d$, that holds the row to be lowered, and the plate D', and then tightening up the thumb-nuts $d^3$. This is desirable when differently-shaped side rails, $a^6$, are employed. The plate D' of the feed-gripper D is guided horizontally in grooved guide-pieces $D^2$, which are again vertically guided by center ribs, $d^4$, in upright centrally-grooved arms $B^2$, attached to the bracket B'. Longitudinally-reciprocating motion is imparted to the feed-gripper D by a lever, $d^5$, which is pivoted to a lug, $d^6$, of the feed-plate D', said lever being adjustably pivoted to the slotted lower end of a lever, $d^7$, which is fulcrumed to upright side standards, $B^3$, at the front end of the feed-box. The upper end of the lever $d^7$ is provided with an anti-friction roller and operated by a cam-groove, $d^8$, of the cam O on the driving-shaft C. (Shown in Fig. 14.) By adjusting the end of the lever $d^5$ higher or lower on the slotted lower end of the fulcrumed lever $d^7$ the extent of the longitudinal forward and backward motion or stroke of the feed-gripper D is regulated so as to produce the required thickness of the filler. The longer the feed motion the larger will be the quantity of tobacco fed to the cutting-knife and the larger the filler, while the shorter the feed motion the smaller will be the quantity of tobacco fed to the cutting-knife and consequently the smaller the filler produced from the same. When the forward motion of the feed-gripper D, by the lever-and-cam mechanism just described, has been accomplished, an upward motion is imparted to the feed-gripper D by a bell-crank lever, $d^9$, which is applied to a transverse rod, $d^{10}$, connecting the guides $D^2$ of the feed-plate D'. The bell-crank lever $d^9$ is fulcrumed to the supporting-standards $B^3$, the upper end of the same being provided, in the usual manner, with an anti-friction roller that is engaged by a cam-groove, $d^{11}$, of the cam O' of the driving-shaft S. (Shown in Fig. 15.) By the lifting motion of the feed-gripper D the teeth of the same are withdrawn from the tobacco, which is retained in the feed-box by the top plate of the same, the feed-gripper being then moved backward clear of the tobacco by the action of the levers $d^5$ $d^7$ and the cam O, then lowered into the feed-box by the action of the lever $d^9$ and cam O', and then moved forward by the action of the levers $d^5$ and $d^7$, the alternating action of these levers and cams producing successively the forward motion of the tobacco by the forward motion in a right line of the feed-gripper, the raising of the feed-gripper perpendicularly, so as to clear the tobacco, the backward motion and the lowering perpendicularly of the same, so as to grip again the tobacco and feed it forward again to the cutting-knife, producing thereby the gradual forward feeding of the tobacco from the stationary feed-box to the cutting-knife in a very accurate and reliable manner, and lightening up and loosening the tobacco without disturbing its lateral arrangement in the feed-box. Thus the feed-gripper D is a four-motion toothed feed-gripper having, first, a motion toward the feed-box, its teeth piercing the mass of the filling to be fed, then a motion forward longitudinally of the feed-box feeding the filling bodily forward, then a motion away from the feed-box, its teeth drawing entirely out from the mass of filling, and then a motion backward longitudinally of the feed-box to the point of beginning. When all the tobacco in the feed-box has been fed to the cutting-knife, the empty feed-box is removed and a new one, which has been charged with tobacco, inserted in its place, so as to continue the regular operation of the machine.

*The cutting knife.*—The cutting-knife E is guided in vertical ways at the front end of the stationary feed-box C. It is vertically reciprocated by a cam-groove, $e$, of the cam $O^2$, Fig. 13, which engages an anti-friction roller, $e^2$, at the upper end of the shank $e'$ of the cutting-knife, said shank being forked, so as to clear the driving-shaft S, as shown in dotted lines in Fig. 2. During the forward motion of the tobacco by the feed mechanism the cutting-knife E as well as the plunger G are raised while the knife is in lowered position, so as to close the front end of the feed-box when the tobacco is not fed forward. Immediately when the forward feed has terminated, the cutting-knife descends by the action of its cam and cuts off the tobacco in connection with a stationary copper plate, $e^x$, at the front edge of the supporting-plate of the feed-box. The cut off tobacco is taken up by the retaining-box F until the plunger G descends. The cutting-knife E is provided with a number of transverse slots, $e^3$, in its upper part, as shown in Fig. 6, said slots imparting a certain elasticity to the knife, so that the same can be used for some time without resharpening. The cutting-knife E is attached by screws to a screw-socket, $e^4$, which can be adjusted higher or lower on the shank $e'$. The screw-socket $e^4$ is applied to the upper slotted portion of the knife, the fastening-screws passing through the knife at points between the slots $e^3$, as shown in Figs. 6 and $6^a$.

*The retaining-chamber and plunger.*—The retaining-chamber F is applied in a detachable manner to the upright guide-rails of the cutting-knife, as shown clearly in Figs. 8, $8^a$, $8^b$, and $8^c$. These guide rails are shown at $A^4$ in Figs. $8^b$ and $8^c$. To these guide-rails is applied the casing $F^2$, as shown. Within this casing $F^2$ are placed the shapers F', supported, as clearly shown in Figs. 8 and $8^a$, by a hooked arm taking over a part of the casing $F^2$. These shapers form the retaining-chamber F as to its front and sides, the knife forming the back wall of the retaining-chamber. The shapers F' may be lifted out of the casing $F^2$ and others of different shape substituted, as is the case in passing from Figs. $8^b$ to $8^c$. The horizontal cross-section of the retaining-chamber F is so shaped that it corresponds to the shape of the filler and the ultimate shape of the bunch to be produced. The bottom of the retaining-chamber F is formed of one or more hinged and spring-actuated gates or fingers, $f$, which are held up in position to form the bottom of the chamber F by ordinary barrel or spiral springs, and which are forced downward and so open by the plunger G as it descends, so as to deposit the tobacco into the bight of the rolling-apron, said bight being formed in the pocket $h$ of the rolling-table H'. As soon as the plunger in its upward motion is withdrawn above the fingers they instantly close again by the action of their springs, so that the chamber F is ready to receive the tobacco cut off by the downward stroke of the cutting-knife. The plunger G is straight at the lower end, but so shaped at its side that its horizontal cross-section corresponds to the vertical section of the tobacco in the feed-chamber, while the horizontal section of the retaining-chamber corresponds to the shape of the filler and the bunch to be produced therefrom, as shown in Figs. 7, $8^b$, and $8^c$. By making the shape of the retaining-chamber and of the plunger to correspond to the shape of the bunch to be produced any desired shape of cigar can be made by our improved bunching-machine, which is a feature that has not before been accomplished in similar machines of this class. For this purpose the shapers or side walls, F', of the retaining-chamber as well as the plunger are made detachable and interchangeable. The shapers or side walls, F', of the retaining-chamber are detached by simply lifting them out of the casing $F^2$, as described. Having thus lifted out the shapers, the plunger is readily unscrewed from its operating-lever and also lifted out and differently-shaped plunger and side walls may be substituted. By giving them the same cross-section as that of the feed-box the shape of the filler as cut off by the knife is preserved and the filler held together, so as to be transmitted in its original shape into the bight of the rolling-apron. Vertically-reciprocating motion is imparted to the plunger G by the cam-groove $g$ of the double cam $O^2$, which cam-groove engages an anti-friction roller, $g^2$, at the upper slotted end of the shank $g'$, that is attached to the upper part of the plunger, as shown in Fig. 1.

*The rolling device.*—Vertically below the plunger G and the retaining-chamber F is arranged in the rolling-table the pocket $h$. The rolling-table H' extends backward below the front part of the feed-box, so as to leave a sufficient space for the reciprocating and axially-turning roller $H^3$, as shown in Figs. 4 and 11. When the plunger descends and transmits the tobacco from the retaining-chamber F to the rolling-apron $H^2$, the roller $H^3$ is located at the rear end of the rolling table H', back of the pocket $h$. The rolling-apron $H^2$ is attached at its rear end to the roller $H^3$, and at the front end to a transverse roller, $h'$, located below the front end of the rolling-table H'. In front of the rolling-table H' are pivoted receiving-fingers $h^2$, for the finished bunch, to which a spring action is imparted by a suitable torsion-spring, said retaining-fingers being provided with fingers $h^3$, extending at right angles therefrom, said fingers bearing on the front part of the apron $H^2$, so as to keep the same in proper tension. These receiving and retaining fingers $h^2$ and $h^3$ are held by a torsional spring, $h^5$, (shown in Fig. 17,) or by other suitable spring device, in the position in which they are shown in Fig. 2, except as they are forced forward by the tension of the apron on the fingers $h^3$, or by the roller on its forward reciprocation striking the fingers $h^2$. The former is shown in Fig. 11 in full lines. The latter occurs as the rolling of each bunch is completed, the rolled bunch being delivered onto the fingers $h^2$ and $h^3$ when the end of the table is passed. The binder is placed on the apron by the attendant while the roller $H^3$ is at the rear part of the table, back of the pocket, and before the filler is transmitted into the bight of the apron by the plunger. As soon as the filler has been transmitted to the apron the forward motion of the roller $H^3$ begins. This motion is accomplished in such a manner that during the forward motion of the roller the apron is first unwound therefrom, so as to give the required degree of slack to the apron and permit the roller to pass over the pocket of the table without lifting the filler in the bight of the apron from the pocket. Then gradually take up the slack of the apron, raise the filler from the pocket of the table, and revolve it in the bight of the apron and into the binder until the bunch is formed by the wrapping of the binder around the filler. This motion is imparted to the roller $H^3$ by a fork-shaped lever, $h^4$, that is applied to the shaft of the same, the upper end of the fork-shaped lever $h^4$ being connected by a pivoted link, $h^5$, to the standard A, and applied by an anti-friction roller, $h^\times$, to the cam-groove $g$ of the cam $O^2$, the lever $h^4$ being extended above the friction-roller and connected by a pivot-link, $h^6$, to a bracket-arm, $h^7$, of the standard A, as shown in Figs. 1 and 2, the combined action of the lever $h^4$ and pivot-links $h^5$ $h^6$ and the cam-groove $g$ producing the forward and backward motion of the roller $H^3$ over the table $H'$ at the proper time—to wit, after the same cam-groove $g$, operating on the anti-friction roller $g^2$, has forced down and raised again the part $g'$, and with it the plunger G, and providing at the same time for the vertical play of the roller $H^3$ and forked lever $h^3$ during the motion of the roller over the table $H'$.

To one end of the shaft of the roller $H^3$ are applied two tension-belts, $i$ $i'$, which are so arranged as to wind in opposite directions on said shaft, they being separated by an intermediate washer, $i^2$, as shown in Fig. 10. The belt $i'$ is attached by a clamp $i^3$ to a spiral tension-spring, $i^4$, which latter is attached to the stationary bracket B'. The second belt, $i$, is attached by a clamp, $i^5$, to the upper end of an oscillating and spring-actuated arm, $i^6$, which is pivoted to bearings on the under side of the table B, as shown in Figs. 11 and 12. By the forward and backward motion of the roller $H^3$ the belts $i$ $i'$ alternately unwind from the shaft of the roller $H^3$, so as to impart the required steadiness of motion to the same to produce the uniform winding of the binder around the filler and exert on the bunch a yielding pressure corresponding to that of the hand-in-hand made bunches. While the roller is moved horizontally over the rolling-apron it is simultaneously turned on its axis, but in an opposite direction to the movement imparted by its lever, so as to wind up the apron as the rolling of the bunch proceeds. This produces the tightening up of the apron, a reduction in the size of the bunch, and a larger number of rotations of the bunch on its axis. By this winding-up action, in connection with the tension-belts, a uniform yielding pressure is exerted on the bunch, so that the binder is uniformly wrapped around the filler and a bunch of the required quality produced.

The form of roller I prefer to use is shown in Figs. 9, 9$^a$, and 9$^b$, in which $i^7$ is the axle or shaft to which the rear end of the apron is fastened, and $i^8$ is a slotted sleeve adapted, as shown, to be applied to the roller at its apron-winding part, after the rear end of the apron has been fastened to the axle or core of the roller, and $i^9$ and $i^{10}$ are the two pulleys on which the tension-belts or roller-rotating straps or bands $i$ $i'$ are wound.

The axle or shaft $i^7$, in the form of roller shown in Figs. 9, 9$^a$, and 9$^b$, consists of a central shaft having the two pulleys $i^9$ and $i^{10}$ at one end, and having an enlarged portion along so much of the length of the roller as is over the table, said enlarged portion being integral with the central shaft, or shrunk solidly and immovably on the central shaft, said enlarged portion having a longitudinal slot enlarged at its inner side, as shown in section in Figs. 9$^a$ and 9$^b$. The rear end of the apron is corded in any suitable way and is then slipped into this slot from the end of the roller until it and its corded end fills the slot from end to end. The slotted sleeve $i^8$ is then slid onto the roller from the end of the roller away from the pulleys, the slot of the sleeve being sufficiently wide to take in the thickness of the apron, one side of the slot sliding on one side of the apron and the other side of the slot on the other side of the apron until the sleeve extends a little way on each side of the apron, when it is in position to operate. This sleeve $i^8$ is made a snug sliding fit for the enlarged axle of the roller, and when in position it still further enlarges that part—to wit, the apron-winding part of the roller—up to more than the full diameter of the pulleys $i^9$ and $i^{10}$, thereby winding up the apron on the roller by its rotation faster than the roller moves forward over the apron by its reciprocation, and so rolling the bunch in a rapidly-tightening bight of the apron. The slotted sleeve $i^8$ is thus readily removable and as readily replaced on unshipping the roller from its carrying-levers. When the roller arrives at the front part of the rolling-table H', the bunch is delivered to the receiving-fingers $h^2$ and removed from the same by the attendant and placed into the mold. The receiving-fingers are oscillated by the apron and facilitate the removal of the bunch from the rolling device. The roller $H^3$ is thus an apron-winding bight-forming roller.

*Operation of the machine.*—In operating the machine the side rails of the feed-box are adjusted according to the shape and length of the bunch desired to be made. The feed-box is then carefully filled with tobacco, closed by its cover, and placed on the supporting-bracket B'. When the feed-box is properly locked to the bracket B', the machine is started by putting on the belt. The tobacco in the feed-box is then intermittingly fed forward by the feed-gripper to the action of the cutting-knife, which cuts off the required quantity of tobacco that is to form the filler and transmits it into the retaining-chamber, from which it is transferred by the descending plunger into the bight of the apron, said bight being located in the pocket of the rolling-table. On the ascent of the plunger the roller begins its forward motion and passes over the pocket in the rolling-table, so as to close the bight of the rolling-apron, which latter is gradually wound around the roller, so as to wrap the binder around the filler, roll them into a bunch, and deliver the same to the receiving-fingers, from which it is removed by the attendant. Bunches of any desired shape, length, and thickness can be produced with the machine by properly adjusting the feed mechanism, selecting and adjusting the side rails of the feed-box, and adjusting the size of the retaining-chamber and plunger. As the machine turns out a large number of bunches within a given time, a considerable saving of time and labor is the result, while the skilled hands heretofore required for making bunches are dispensed with.

The entire machine has been described in the form in which we prefer to use it; but manifestly many variations may be made in the details without departing from the invention.

Referring to the pending application of David J. Boehm, (one of the joint inventors herein,) filed January 20, 1888, Serial No. 261,380, we here expressly disclaim whatever is shown and not claimed in this application that is shown and claimed in that application.

Having thus described our invention, we claim as new and desire to secure by Letters Patent—

1. The combination of a detachable feed-box, means for locking the same in position upon the machine-frame, a vertically and longitudinally reciprocating feed-gripper operating in said box, a vertically-reciprocating cutting-knife, a retaining-chamber having a hinged bottom gate or gates, a vertically-reciprocating plunger operating in said chamber, and a rolling device for rolling the binder around the filler delivered by the plunger, substantially as set forth.

2. The combination of a detachable feed-box, means for locking it in position upon the machine-frame, a vertically and longitudinally reciprocating feed-gripper operating in said box, a vertically-reciprocating cutting-knife, a retaining-chamber having a hinged bottom gate or gates, a vertically-reciprocating plunger operating in said chamber, a rolling-table having a pocket vertically below the plunger, and a rolling-apron attached at one end to a stationary point of support and at the other end to a horizontally-reciprocating roller that is adapted to turn on its axis in a direction opposite to its reciprocating motion, substantially as set forth.

3. The combination of a detachable feed-box having a longitudinally-slotted top plate or cover, a vertically and longitudinally reciprocating feed-gripper operating in said box and having teeth passing through said slotted top plate, a vertically-reciprocating cutting-knife at the front end of the feed-box, a retaining-chamber having a hinged bottom gate or gates, a vertically-reciprocating plunger operating in said chamber, a rolling-table having a pocket vertically below said plunger, a reciprocating roller, and a rolling-apron attached at the front end to a fixed point of support and at the rear end to the roller, said roller having an axial motion in a direction opposite to its reciprocating motion, substantially as set forth.

4. The combination of a detachable feed-box having laterally-adjustable side rails and a slotted top plate, a vertically and longitudinally reciprocating feed-gripper operating in said box and having central stationary teeth and laterally and vertically adjustable side teeth, a vertically-reciprocating cutting-knife, a retaining-chamber having a hinged bottom gate or gates, a vertically-reciprocating plunger operating in said chamber, a rolling-table having a pocket vertically below said plunger, a reciprocating and axially-turning roller, and a rolling-apron attached at the front end to a stationary point or support and at the rear end to the roller, substantially as set forth.

5. The combination of a supporting-frame having a horizontal and longitudinally-grooved bracket, a detachable feed-box provided with a longitudinal bottom tongue located in the grooved bracket, a fulcrumed locking-hook engaging said tongue, a vertically and longitudinally reciprocating feed-gripper operating in said box, a vertically-reciprocating cutting-knife, a retaining-chamber having a bottom gate or gates, and a vertically-reciprocating plunger operating in said chamber, substantially as set forth.

6. The combination of a supporting-standard having a horizontal longitudinally-grooved bracket, a detachable feed-box located therein and having a longitudinal bottom tongue fitting into the groove of said bracket, a longitudinally-slotted top plate and laterally-adjustable side rails, a pivoted and weighted locking-hook for engaging the feed-box, and a vertically and longitudinally reciprocating feed-gripper operating in said box having a central fixed row of teeth and laterally and vertically adjustable side rows of teeth, substantially as set forth.

7. The combination of a detachable feed-box having laterally-adjustable side rails and a longitudinally-slotted top plate, and a vertically and longitudinally reciprocating feed-gripper operating in said box, having a row of fixed center teeth and rows of adjustable side teeth, a vertically-reciprocating cutting-knife, a retaining-chamber having a hinged bottom gate or gates, and a vertically-reciprocating plunger operating in said chamber, the horizontal section of said retaining-chamber and plunger corresponding to the vertical cross-section of the feed-box formed by the bottom, side rails, and top plate of the feed-box, substantially as set forth.

8. The combination of a detachable feed-box having laterally-adjustable and tapering side rails, a vertically and longitudinally reciprocating feed-gripper operating in said box, a vertically-reciprocating cutting-knife, a retaining-chamber having a removable side wall and a hinged bottom gate or gates, and a detachable plunger operating in said chamber, the horizontal cross-section of the retaining-chamber and plunger corresponding with the vertical transverse section of the feed-box, substantially as set forth.

9. The combination of a detachable feed box, a vertically and longitudinally reciprocating feed-gripper operating therein, a vertically-reciprocating cutting-knife, a retaining-chamber having a hinged bottom gate or gates, a vertically-reciprocating plunger operating in said chamber, a rolling-table having a pocket vertically below the plunger, a horizontally-reciprocating roller, a rolling-apron attached at the front end to a stationary point below the table and at its rear end to the roller, and tension-belts applied in opposite directions to the axle of the roller, whereby an axially-rotary motion is imparted to the roller in a direction opposite to the direction of its reciprocating motion, substantially as set forth.

10. The combination of a detachable feed-box, a vertically and longitudinally reciprocating feed-gripper operating therein, a vertically-reciprocating cutting-knife, a retaining-chamber having a hinged bottom gate or gates, a vertically-reciprocating plunger operating in said chamber, a rolling-table having a pocket vertically below said plunger, spring-actuated retaining-fingers at the front of said rolling-table, a horizontally-reciprocating roller, a rolling-apron attached at its front end to a fixed point of support below the table and at its rear end to said roller, and spring-actuated tension-belts applied in opposite directions to the axle of the roller, so as to impart to the same an axially-rotary motion in a direction opposite to the direction of its reciprocating motion, substantially as set forth.

11. The combination of a supporting-standard having a horizontal bracket provided with grooved upright arms, a detachable feed-box locked to said bracket, longitudinally-grooved guide-pieces guided vertically in said arms, a reciprocating feed-gripper guided by said guide-pieces, cams on the driving-shaft having cam-grooves, and intermediate levers connecting the feed-grippers and the guide-pieces of the same with said cams, so as to impart a vertically and longitudinally reciprocating motion to said feed-gripper, substantially as set forth.

12. The combination of a roller, a rolling-table, a rolling-apron, a forked oscillating lever, a rotary driving-shaft, a cam having a cam-groove engaging the upper end of said lever, and pivot-links connecting the forked lever with fixed points in the supporting-standard, said points being respectively above and below the connection of the forked lever with the cam-groove for imparting horizontally-reciprocating motion to the said roller over the rolling-table, substantially as set forth.

13. The combination of a rolling-table, a rolling-apron, a roller attached to the rear end of said apron, hinged spring-fingers at the front end of said table, tension-belts applied in opposite direction to the axle of the roller, spring-arms attached to opposite ends of said belts, a forked oscillating lever applied to the roller, a rotary driving-shaft, and a cam having a cam-groove engaging the upper end of said lever, so as to impart reciprocating motion to the roller simultaneously with an axially-rotary motion in a direction opposite to the reciprocating motion, substantially as set forth.

14. In a cigar-bunching machine, the combination of the table and apron with an apron-winding bunching-roller and rotating and reciprocating mechanism, whereby the effective bearing-surface of the roller is increased and the bunch is rolled in a gradually-tightening bight, substantially as and for the purposes set forth.

15. In a cigar-bunching machine, the combination of the table and apron, the table having a pocket at its rear end, with an apron-winding bunching-roller and rotating and reciprocating mechanism, the rear end of the apron being secured, as shown, on the circumference of the roller, whereby the apron is first unwound from and then wound upon the roller, substantially as and for the purposes set forth.

16. In a cigar-bunching machine, the combination of the table and apron with an apron-winding bunching-roller having a removable slotted sleeve at its apron-winding part, and rotating and reciprocating mechanism, substantially as and for the purposes set forth.

17. In a cigar-bunching machine, the combination of the table and apron with an apron-winding bunching-roller and reciprocating mechanism, the roller having two drums or pulleys, and with two roller-rotating straps or bands secured, as shown, to the upper periphery of the two drums or pulleys, substantially as and for the purposes set forth.

18. In a cigar-bunching machine, the combination of the table and apron with an apron-winding bunching-roller and reciprocating mechanism, the roller having two drums or pulleys, and with two roller-rotating straps or bands secured at their outer ends to spring devices and at their inner ends to the inner periphery of two drums or pulleys, substantially as and for the purposes set forth.

19. In a cigar-bunching machine, the combination of the four-motion toothed feed-gripper, having mechanism to give it the four right-lined motions described, with the stationary closed feed-box having longitudinal slots opposite the teeth of the feed-gripper, whereby the filling is fed bodily forward through the feed-box longitudinally of the same without disturbing its distribution, substantially as and for the purposes set forth.

20. In a cigar-bunching machine, the combination of the four-motion toothed feed-gripper, having mechanism to give it the four right-lined motions described, with the stationary closed feed-box cigar-shaped in transverse section and having slots opposite the teeth of the feed-gripper, whereby the filling is primarily distributed in the feed-box and is fed bodily forward without disturbing that distribution, substantially as and for the purposes set forth.

21. In a cigar-bunching machine, the combination of the four-motion toothed feed-gripper, having mechanism to give it the four right-lined motions described, with the stationary closed feed-box having longitudinal side rails or shaping-strips, and having slots opposite the teeth of the feed-gripper, whereby the filling is primarily distributed in the feed-box and is fed bodily forward without disturbing that distribution, substantially as and for the purposes set forth.

22. In a cigar-bunching machine, the combination of the four-motion toothed feed-gripper with the stationary closed feed-box increasing in depth toward the delivery end and having slots opposite the teeth of the feed-gripper, whereby the filling is fed bodily forward and is loosened up without disturbing its distribution, substantially as and for the purposes set forth.

In testimony that we claim the foregoing as our invention we have signed our names in presence of two subscribing witnesses.

DAVID J. BOEHM.
CHARLES F. REED.

Witnesses:
PAUL GOEPEL,
SIDNEY MANN.